United States Patent [19]

Nelson et al.

[11] Patent Number: 5,468,371
[45] Date of Patent: * Nov. 21, 1995

[54] CATALYST FOR RESIDUAL CONVERSION DEMONSTRATING REDUCED TOLUENE INSOLUBLES

[75] Inventors: Gerald V. Nelson, Nederland; Govanon Nongbri; Roy E. Pratt, both of Port Neches, all of Tex.

[73] Assignee: Texaco Inc., White Plains, N.Y.

[*] Notice: The portion of the term of this patent subsequent to Jul. 25, 2012, has been disclaimed.

[21] Appl. No.: 226,191

[22] Filed: Apr. 11, 1994

[51] Int. Cl.$^6$ ............... C10G 45/04; C10G 47/12
[52] U.S. Cl. ............... 208/216 PP; 208/112; 208/217; 208/251 H; 208/254 H; 208/142
[58] Field of Search ............... 208/216 PP, 251 H, 208/254 H, 217, 142, 112

[56] References Cited

U.S. PATENT DOCUMENTS

| | | | |
|---|---|---|---|
| 4,225,421 | 9/1980 | Hensley, Jr. | 208/216 PP |
| 4,395,324 | 7/1983 | Derbyshire et al. | 208/216 PP |
| 4,395,329 | 6/1983 | LePage et al. | 208/216 PP |
| 4,454,026 | 7/1984 | Hensley, Jr. | 208/216 PP |
| 4,549,957 | 10/1985 | Hensley, Jr. | 208/216 PP |
| 4,941,964 | 7/1990 | Dui | 208/216 PP |
| 5,047,142 | 9/1991 | Sherwood, Jr. | 208/216 PP |

*Primary Examiner*—Helane Myers
*Attorney, Agent, or Firm*—James L. Bailey; Kenneth R. Priem; Cynthia L. Hunter

[57] ABSTRACT

Heavy hydrocarbons are hydrotreated to increase content of components boiling below 1000° F. by contact with Group VIII non-noble metal oxide and Group VIB metal oxide on alumina having a Total Surface Area of 175–220 m$^2$/g, a Total Pore Volume (TPV) of 0.6–0.8, and a Pore Diameter Distribution whereby $\leq 33\%$ of the TPV is present as primary micropores of diameter $\leq 100$ Å, at least about 41% of TPV is present as secondary micropores of diameter of about 100 Å–200 Å, and about 16%–26% of the TPV is present as mesopores of diameter $\geq 200$ Å. Phosphorus containing compounds are avoided during catalyst preparation.

14 Claims, No Drawings

CATALYST FOR RESIDUAL CONVERSION DEMONSTRATING REDUCED TOLUENE INSOLUBLES

RELATED APPLICATIONS

This application is related to U.S. patent application Ser. No. 07/953,176, (Attorney's D#92,030), filed Sep. 29, 1992 now abandoned, which discloses a porous alumina support bearing 2.2–6 wt % of a non-noble Group VIII metal oxide, 7–24 wt % of a Group VIB metal oxide and 0–2 wt % of a phosphorous oxide, said catalyst having a Total Surface Area of 150–240 $m^2/g$, a Total Pore 0.7–0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å–200 Å and about 26–46% of the Total Pore Volume is present as mesopores of diameter $\geq$200 Å.

FIELD OF THE INVENTION

This invention relates to a process for hydrotreating a hydrocarbon feed. More particularly it relates to a hydroconversion process employing catalysts with a specified pore size distribution.

BACKGROUND OF THE INVENTION

As is well known to those skilled in the art, it is desirable to convert heavy hydrocarbons, such as those having a boiling point above about 1000° F., into lighter hydrocarbons which are characterized by higher economic value. It is also desirable to treat hydrocarbon feedstocks, particularly petroleum residues, to achieve other goals including hydrodesulfurization (HDS), hydrodenitrogenation (HDN), carbon residue reduction (CRR), and hydrodemetallation (HDM)—the latter particularly including removal of nickel compounds (HDNi) and vanadium compounds (HDV).

These processes typically employ hydrotreating catalysts with specified ranges of pores having relatively small diameters (i.e. micropores) and pores having relatively large diameters (i.e. macropores).

U.S. Pat. No. 5,047,142 (Dai et al.) discloses a catalyst composition useful in the hydroprocessing of a sulfur- and metal-containing feedstock comprising an oxide of nickel or cobalt and an oxide of molybdenum deposited on a porous alumina support in such a manner that the molybdenum gradient of the catalyst has value of less than 6.0 and 15–30% of the nickel or cobalt is in an acid extractable form, and having a surface area of 150–210 $m^2/g$, a Total Pore Volume (TPV) of 0.50–0.75 cc/g, and a pore size distribution such that less than 25% TPV is in pores having diameters of less than 100 Å, 70.0–85.0% TPV is in pores having diameters of 100 Å–160 Å and 1.0–15.0% TPV is in pores having diameters of greater than 250 Å.

U.S. Pat. No. 4,941,964 (Dai et al.) discloses a process for the hydrotreatment of a sulfur- and metal-containing feed which comprises contacting said feed with hydrogen and a catalyst in a manner such that the catalyst is maintained at isothermal conditions and is exposed to a uniform quality of feed, the catalyst comprising an oxide of a Group VIII metal, an oxide of a Group VIB metal and 0–2.0 weight % of an oxide of phosphorus on a porous alumina support and having a surface area of 150–210 $m^2/g$ and a Total Pore Volume (TPV) of 0.50–0.75 cc/g, such that 70–85% TPV is in pores having diameters of 100 Å–160 Å and 5.5–22.0% TPV is in pores having diameters of greater than 250 Å.

U.S. Pat. No. 4,738,944 (Robinson et al.) discloses a catalyst composition useful in the hydrotreatment of hydrocarbon oils, the catalyst containing nickel and phosphorus and about 19–21.5% Mo (calculated as the oxide) on a porous refractory oxide having a narrow pore size distribution wherein at least 10% TPV is in pores having diameters less than 70 Å, at least 75% TPV is in pores having diameters between 50–110 Å, at least 60% TPV is in pores having diameters within about 20 Å above and below the average pore diameter; and at most 25% TPV, most preferably less than 10% TPV, is in pores having diameters greater than 110 Å.

U.S. Pat. No. 4,652,545 (Lindsley et al.) discloses a catalyst composition useful in the hydroconversion of heavy oils, the catalyst containing 0.5–5% Ni or Co and 1.8–18% Mo (calculated as the oxides) on a porous alumina support, having 15–30% of the Ni or Co in an acid extractable form, and further characterized by having a Total Pore Volume (TPV) of 0.5–1.5 cc/g with a pore diameter distribution such that (i) at least 70% TPV is in pores having 80–120 Å diameters, (ii) less than 0.03 cc/g of TPV is in pores having diameters of less than 80 Å, and (iii) 0.05–0.1 cc/g of TPV is in pores having diameters of greater than 120 Å.

U.S. Pat. No. 4,395,328 (Hensley, Jr. et al.) discloses a process for the hydroconversion of a hydrocarbon stream containing asphaltenes and a substantial amount of metals, comprising contacting the stream (in the presence of hydrogen) with a catalyst present in one or more fixed or ebullating beds, the catalyst comprising at least one metal which may be a Group VIB or Group VIII metal, an oxide of phosphorus, and an alumina support, where the alumina support material initially had at least 0.8 cc/gm of TPV in pores having diameters of 0–1200 Å, and at least 0.1 cc/gm of TPV in pores having diameters of 1200–50,000 Å. The support material was heated with steam to increase the average pore diameter of the catalyst support material.

U.S. Pat. No. 4,341,625 (Tamm) discloses a process for hydrodesulfurizing a metal-containing hydrocarbon feedstock which comprises contacting the feedstock with a catalyst comprising at least one hydrogenation agent (i.e. Group VIB or Group VIII metal or combinations thereof) on a porous support, the catalyst being further characterized by having a TPV of 0.5–1.1 cc/g with at least 70% TPV in pores having diameters of 80–150 Å and less than 3% TPV in pores having diameters greater than 1000 Å.

U.S. Pat. No. 4,328,127 (Angevine et al.) discloses a catalyst composition for use in the hydrodemetallation-desulfurization of residual petroleum oils, the catalyst comprising a hydrogenating component (i.e. Group VIB or Group VIII metal, or combinations thereof) on a porous support, further characterized by having a TPV of 0.45–1.5 cc/g with 40–75% TPV in pores having diameters of 150–200 Å, and up to 5% TPV in pores having diameters of greater than 500 Å.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullated bed, slurry, disperse phase, or fluidized bed reactor, where the catalyst comprises a hydrogenation component (i.e. Group VIB or Group VIII metal) on a porous support, and is further characterized by having a TPV of 1.0–2.5 cc/g with no more than 0.05–0.20 cc/g of TPV in pores having diameters of greater than 400 Å.

U.S. Pat. No. 4,305,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, further characterized by having a TPV of 0.4–0.8 cc/g with 0–50% TPV in pores having diameters smaller than 50 Å, 30–80% TPV in pores having diameters of 50–100 Å, 0–50% TPV in pores having diameters of 100–150 Å, and 0–20% TPV in pores having diameters greater than 150 Å.

U.S. Pat. No. 4,297,242 (Hensley, Jr. et al.) discloses a 2-stage process for the catalytic hydrotreatment of hydrocarbon streams containing metal and sulfur compounds, the process comprising: (i) first contacting the feedstock with hydrogen and a demetallation catalyst comprising a Group VIB and/or Group VIII metal; and (ii) thereafter reacting the effluent with a catalyst consisting essentially of at least one Group VIB metal on a porous support, having a TPV of 0.4–0.9 cc/g and a pore size distribution such that pores having diameters of 50–80 Å constitute less than 40% TPV, pores having diameters of 80–100° constitute 15–65% TPV, pores having diameters of 100–130 Å constitute 10–50% TPV, and pores having diameters of greater than 130 Å less than 15% TPV.

U.S. Pat. No. 4,089,774 (Oleck et al.) discloses a process for the demetallation and desulfurization of a hydrocarbon oil comprising contacting the oil with hydrogen and a catalyst, the catalyst comprising a Group VIB metal and an iron group metal (i.e. iron, cobalt, or nickel) on a porous support, having a surface area of 125–210 m$^2$/g and TPV of 0.4–0.65 cc/g with at least 10% TPV in pores having diameters less than 30 Å, at least 50% of pore volume accessible to mercury being in pores having diameters of 30–150 Å, and at least 16.6% of pores accessible to mercury being in pores having diameters greater than 300 Å.

U.S. Pat. No. 4,082,695 (Rosinski et al.) discloses a catalyst for use in the demetallation and desulfurization of petroleum oils, the catalyst comprising a hydrogenating component (i.e. cobalt and molybdenum) on a porous support, having a surface area of 110–150 m$^2$/g and a pore size distribution such that at least 60% of TPV is in pores having diameters of 100–200 Å and not less than 5% TPV is in pores having diameters greater than 500 Å.

U.S. Pat. No. 4,066,574 (Tamm) discloses a catalyst composition useful in the hydrodesulfurization of a hydrocarbon feedstock containing organometallic compounds, the catalyst comprising Group VIB and Group VIII metal components on a porous support, having a TPV of 0.5–1.1 cc/g with a pore diameter distribution such that at least 70% TPV is in pores of diameters of 80–150 Å and less than 3% TPV is in pores having diameters greater than 1000 Å.

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VIB and Group VIII metal on a porous support, having a TPV of 0.3–1.0 cc/g with a pore diameter distribution such that greater than 50% TPV is in pores of diameters of 70–160 Å, and pores having diameters below 70 Å and above 160 Å are minimized.

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VIB and Group VIII metal on a porous support having a mean pore diameter of 30–60 Å; and (ii) contacting the first hydrodesulfurized hydrocarbon product with hydrogen and a second catalyst under hydrodesulfurization conditions, the second catalyst comprising a Group VIB and Group VIII metal on a porous support further characterized by having a TPV of 0.45–1.50 cc/g with 0–0.5 cc/g of TPV in pores having diameters greater than 200 Å, 0–0.05 cc/g of TPV in pores having diameters below 120 Å, and at least 75% TPV in pores having diameters ±10 Å of a mean pore diameter of 140–190 Å.

U.S. Pat No. 3,876,523 (Rosinski et al.) discloses a process for the demetallizing and desulfurizing of residual petroleum oil comprising contacting the oil with hydrogen and a catalyst, the catalyst comprising a Group VIB and Group VIII metal on a porous support having a pore size distribution such that greater than 60% TPV is in pores having diameters of 100–200 Å, at least 5% TPV is in pores having diameters greater than 500 Å, 10% TPV or less is in pores having diameters less than 40 Å, and the surface area of the catalyst is 40–150 m$^2$/g.

U.S. Pat. No. 3,770,617 (Riley et al.) discloses a process for the desulfurization of a petroleum hydrocarbon feed comprising contacting the feed with hydrogen and a catalyst, the catalyst comprising a Group VIB or Group VIII metal on a porous support having greater than 50% TPV in pores of 30–80 Å, less than 4% TPV in pores having diameters 200–2000 Å, and at least 3% TPV in pores having diameters greater than 2000 Å.

U.S. Pat. No. 3,692,698 (Riley et al.) discloses a catalyst useful in hydroprocessing of heavy feed stocks, the catalyst comprising a mixture of Group VIB and Group VIII metals on a porous support and having a pore size distribution such that a major portion of its TPV is in pores of diameters ranging from 30–80 Å, less than 4% TPV is in pores of diameters of 200–2000 Å, and at least 3% TPV is in pores of diameters greater than 2000 Å.

U.S. Pat. No. 4,746,419 (Peck et al) discloses catalyst compositions characterized by the presence of 0.1–0.3 cc/g in pores having diameter greater than 1200 Å and no more than 0.1 cc/g of its pore volume in pores having diameter greater than 4000 Å.

Early petroleum distillate hydrotreating catalysts generally were monomodal catalysts with very small micropore diameters (for example, less than 100 Å) and rather broad pore size distributions. First generation petroleum resid hydrotreating catalysts were developed by introducing a large amount of macroporosity into a distillate hydrotreating catalyst pore structure to overcome the diffusion resistance of large molecules. Such catalysts, which are considered fully bimodal HDS/HDM catalysts, are typified by U.S. Pat. Nos. 4,395,328 and 4,089,774 supra.

Another approach to developing improved catalysts for petroleum resid processing has involved enlarging the micropore diameters of essentially monomodal catalysts (having no significant macroporosities) to overcome the above described diffusion limitations. Essentially monomodal catalysts with small micropore diameters and low macroporosities designed for improved petroleum resid HDS include those disclosed in U.S. Pat. No. 4,738,944; 4,652,545; 4,341,625; 4,309,378; 4,306,965; 4,297,242; 4,066,574; 4,051,021; 4,048,060 (1st stage catalyst); 3,770,617; and 3,692,698, supra. Essentially monomodal catalysts with larger micropore diameters and low macroporosities designed for improved petroleum resid HDM include those disclosed in U.S. Pat. Nos. 4,328,127; 4,309,278; 4,082,695; 4,048,060 (2nd stage catalyst); and 3,876,523, supra.

A recent approach to developing improved catalysts for petroleum resid processing has involved the use of catalysts having micropore diameters intermediate between the above described monomodal HDS and HDM catalysts, as well as sufficient macroporosities to overcome the diffusion limitations for petroleum bottoms HDS (i.e., sulfur removal from hydrocarbon product of a hydrotreated petroleum resid having a boiling point greater than 1000° F.) but limited macroporosities to limit poisoning of the interiors of the catalyst particles. Catalysts, with micropore diameters intermediate between the above-described monomodal HDS and HDM catalysts with limited macroporosities include those of U.S. patent application Ser. Nos. 168,095 (now U.S. Pat. No. 4,941,964); and 194,378 (now U.S. Pat. No. 5,047,142 supra).

However, none of the above-identified catalyst types has been found to be effective for achieving desired levels of hydroconversion of feedstocks components having a boiling point greater than 1000° F. to products having a boiling point less than 1000° F. while simultaneously yielding a 1000° F.+ product having a lower sulfur content.

It is a particular feature of the prior art, however, that it has not heretofore been possible to carry out hydrotreating of such feedstocks to attain desirable results as measured by conversion without undesirable formation of sediment material as measured by the toluene insolubles test. The charge to hydrotreating is typically characterized by a very low toluene insolubles content of 0.02 wt % max.

Toluene insolubles sediment is measured by extracting the sample with toluene as outlined in IP-143 (standard methods for analysis and testing of petroleum products). Typical prior art hydrotreating processes commonly yield toluene insolubles of about 0.17 wt % and as high as about 0.8 wt % in the 1000° F.+ product. Production of large amounts of toluene insolubles is undesirable in that it results in deposition in downstream units which in due course must be removed. This of course requires that the unit be shut down for an undesirably long period of time.

It is an object of this invention to provide a process for hydrotreating a charge hydrocarbon feed containing components boiling above 1000° F. Other objects will be apparent to those skilled in the art.

STATEMENT OF THE INVENTION

In accordance with certain of its aspects, this invention is directed to a process for hydrotreating a charge hydrocarbon feed containing components boiling above 1000° F., and toluene insolubles formers, sulfur, metals, asphaltenes, carbon residue and nitrogen which comprises:

contacting said charge hydrocarbon feed with hydrogen at isothermal hydrotreating conditions in the presence of, as catalyst, a porous alumina support bearing 2.5–6 wt % of a Group VIII non-noble metal oxide, 13–24 wt % of a Group VIB metal oxide, 0–2 wt % of silica and 0–2 wt % of a phosphorus oxide, said catalyst having a Total Surface Area of 175–220 m$^2$/g, a Total Pore Volume of 0.6–0.8 cc/g, and a Pore Diameter Distribution whereby less than about 33% of the Total Pore Volume is present as primary micropores of diameter less than about 100 Å, at least about 41% of the Total Pore Volume is present as secondary micropores of diameter of about 100 Å–200 Å, and about 16–26% of the Total Pore Volume is present as mesopores of diameter $\geq$200 Å, thereby forming a hydrotreated product containing decreased contents of components boiling above 1000° F., toluene insolubles, sulfur, metals, carbon residue and asphaltenes.

DESCRIPTION OF THE INVENTION

The charge hydrocarbon feed which may be charged to the process of this invention may include heavy, high boiling petroleum cuts typified by gas oils, vacuum gas oils, coal/oil mixtures, residual oils, vacuum resid, etc. The process of this invention is particularly useful to treat high boiling oils which contain components boiling above 1000° F. to convert them to products boiling below 1000° F. The charge may be a petroleum fraction having a boiling point of above 650° F. characterized by presence of an undesirably high content of components boiling above 1000° F., toluene insolubles formers, metals, sulfur, carbon residue and asphaltenes.

It is a particular feature of the process of this invention that it may permit treating of a hydrocarbon charge, particularly those containing components boiling above about 1000° F., to form a product which is characterized by an increased content of components boiling below 1000° F. and by decreased content of undesirable components typified by toluene insolubles, metals, sulfur, carbon residues and asphaltenes. Asphaltenes are herein defined as the quantity of n-heptane-insolubles minus the quantity of toluene-insolubles in the feedstock or product.

An illustrative charge which may be utilized is an Arabian Medium/Heavy Vacuum Resid having the properties set forth in the following table.

TABLE

| Property | |
|---|---|
| API Gravity | 4.8 |
| 1000° F.+, vol % | 87.5 |
| 1000° F.+, wt % | 88.5 |
| 1000° F.−, wt % | 11.5 |
| Sulfur, wt % | 5.0 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212° F. | 1430 |
| @ 250° F. | 410 |
| Pour Point, °F. | 110 |
| n-C$_5$ Insolubles, wt % | 28.4 |
| n-C$_7$ Insolubles, wt % | 9.96 |
| Toluuene Insolubles, wt % | 0.02 |
| Asphaltenes, wt % | 9.94 |
| Metals, wppm | |
| Ni | 49 |
| V | 134 |
| Fe | 10 |

In practice of the process of this invention according to certain of its aspects, the charge hydrocarbon feed is contacted with hydrogen at isothermal hydrotreating conditions in the presence of catalyst. Hydrogen is charged at a rate of 2000–10,000 SCFB, preferably 3000–8000, say 5019 SCFB. Temperature of operation is typically 650° F.–850° F., preferably 700° F.–825° F., say 780° F. The operation is essentially isothermal; and the temperature typically may vary throughout the bed by less than about 20° F. Pressure of operation (i.e. reactor inlet partial pressure of hydrogen) may be 1500–3500 psia, preferably 1800–2500 psia, say 2244 psia.

The catalyst support may be alumina. Although the alumina may be alpha, beta, theta or gamma alumina, it is preferred to utilize gamma alumina.

The catalyst which may be employed is characterized by Total Surface Area (TSA), Total Pore Volume (TPV) and Pore Diameter Distribution (Pore Size Distribution PSD). The Total Surface Area is 175–220, preferably 185–210, say 204 m²/g. The Total Pore Volume (TPV) may be 0.6–0.8, preferably 0.6–0.7, say 0.63 cc/g.

The Pore Size Distribution (PSD) is such that the substrate contains primary micropores of diameter less than about 100 Å in an amount less than 0.26 cc/g and preferably less than about 0.20 cc/g. Although it may be desired to decrease the volume of these primary micropores to 0 cc/g, in practice it is found that the advantages of this invention may be attained when the volume of the primary micropores is 0.04–0.20 cc/g, say 0.19 cc/g. This corresponds to less than about 33% of TPV, preferably less than about 30% of TPV. The advantages are particularly attained at about 20–33%, say 30% of TPV. It will be apparent that the figures stated for the % of TPV may vary depending on the actual TPV (in terms of cc/g).

Secondary micropores of diameter in the range of about 100 Å–200 Å are present in amount as high as possible and at least about 0.25 cc/g (41% of TPV), more preferably at least about 0.30 cc/g (48% of TPV) and, most preferably, about 0.31 cc/g (50% of TPV). Although it is desirable to have the volume of secondary micropores as high as possible (up to about 64%) of the TPV, it is found that the advantages of this invention may be attained when the volume of secondary micropores is 0.26–0.51 cc/g, say about 0.31 cc/g. (i.e. 43–64, say 49.2% of TPV).

Mesopores of diameter ≧200 Å are present in amount of 0.1–0.21 cc/g (16–26% of TPV). In the preferred embodiment, it is preferred that the mesopores be present in amount of 0.1–0.15 cc/g (16–24% of TPV) say about 0.13 cc/g (about 20.6% of TPV).

Macropores of diameter ≧1000 Å are preferably present in amount of about 0.05–0.14 cc/g (9–17% of TPV), say about 0.08 cc/g (12.7% of TPV).

The catalysts of this invention are essentially trimodal: there are two major peaks in the secondary micropore region of 100 Å–200 Å and in the primary micropore region of <100 Å and a second lesser peak in the mesopore region of ≧200 Å.

The catalysts of this invention are preferably also characterized by a Pore Mode (dV/dD max from Hg porosimeter measurement) of about 85–110 Å, typically 90 Å, and by a pore volume ±20 Å from dV/dD max of at least 37%, preferably at least 40% as a percent of pores <200 Å.

The charge alumina which may be employed in the practice of this invention may be available commercially from catalyst suppliers or it may be prepared by variety of processes typified by that wherein 85–90 parts of pseudobohmite silica-alumina are mixed with 10–15 parts of recycled fines. Acid is added and the mixture is mulled and then extruded in an Auger type extruder through a die having cylindrical holes sized to yield a calcined substrate of 0.035±0.003 inch diameter. The extrudate is air-dried to a final temperature of typically 250°–275° F. yielding extrudates with 20–25% of ignited solids. The air-dried extrudate is then calcined in an indirect fired kiln for 0.5–4 hours in an atmosphere of air and steam at typically about 1000° F.–1150° F.

It should be noted that the Pore Size Distribution (percent of total) in the finished catalyst may be essentially the same as in the charge alumina from which it is prepared (unless the majority of the pore volume distribution in a given range is near a "break point"—e.g. 100 Å or 200 Å, in which case a small change in the amount of pores of a stated size could modify the reported value of the pore volume falling in a reported range). The Total Surface Area and the Total Pore Volume of the finished catalyst may be 80%–98%, say 96% of the charge alumina from which it is prepared.

Generally the charge alumina and the finished catalysts of this invention will be characterized by the properties set forth in the following Table I wherein the columns are as follows:

1. This column lists the broad characteristics for the catalysts of this invention including Pore Volume in cc/g and as % of TPV; Pore Volume occupied by pores falling in designated ranges as a vol % of Total Pore Volume TPV; Pore Mode; Pore Volume falling within ±20 Å from the dV/dD peak in the less than 250 Å region; Pore Volume falling within ±20 Å from the dV/dD peak in the less than 200 Å region; and Surface Area in m²/g.

2. This column lists specific characteristics for a preferred catalyst falling within the scope of this invention.

TABLE I

| Pore Volume, cc/q (Micromeritics Autopore 9220 Hg porosimeter) | 1 | 2 |
| --- | --- | --- |
| Total | 0.6–0.8 | 0.63 |
| >4000 A | | 0.00 |
| >1000 A | 0.05–0.14 | 0.08 |
| >250 A | 0.07–0.18 | 0.10 |
| >200 A | 0.10–0.21 | 0.13 |
| >100 A | | 0.44 |
| <100 A | 0.26 MAX | 0.19 |
| 100–200 A | 0.25 MIN | 0.31 |
| 100–250 A | | 0.34 |
| 200–1000 A | | 0.05 |
| 250–1000 A | | 0.02 |
| 1000–4000 A | | 0.07 |
| Pore Volume Distribution, of Total Pore Volume | | |
| Total | 100 | 100.0 |
| >4000 A | | 0.0 |
| >1000 A | 9–17 | 12.7 |
| >250 A | 12–22 | 15.9 |
| >200 A | 16–26 | 20.6 |
| >100 A | | 69.8 |
| <100 A | 33 MAX | 30.2 |
| 100–200 A | 41 MIN | 49.2 |
| 100–250 A | | 53.9 |
| 200–1000 A | | 7.9 |
| 250–1000 A | | 3.2 |
| 1000–4000 A | | 12.7 |
| Pore Mode (dV/dD MAX from Hg) | 85–110 | 90 |
| Pore Volume, ± 20 A from dV/dD MAX, % PV <250 A | 35 MIN | 37.7 |
| Pore Volume, ± 20 A from dV/dD MAX, % PV <200 A | 37 MIN | 40.0 |
| Surface Area, m²/g | 175–220 | 204 |

Table II describes the chargestock and operating conditions used in the examples and compares the use of the catalyst of this invention (E) with catalyst (A) used in the art.

TABLE II

FEEDSTOCK PROPERTIES
AND OPERATING CONDITIONS

| | FEEDSTOCK PROPERTIES |
| --- | --- |
| CATALYST | A & E |
| Gravity, API | 4.8 |

TABLE II-continued

FEEDSTOCK PROPERTIES AND OPERATING CONDITIONS

| | | |
|---|---|---|
| Sulfur, wt % | | 5.0 |
| Nitrogen, wppm | | 4480 |
| Vanadium, wppm | | 134 |
| Nickel, wppm | | 49 |
| CCR wt % | | 22.2 |
| 1000° F.$^+$, vol % | | 87.5 |

OPERATING CONDITIONS

| CATALYST | A | E |
|---|---|---|
| Run Number | 5473R | 5484D |
| Inlet hydrogen pressure, psia | 2373 | 2244 |
| Temperature, °F. | 780 | 780 |
| LHSV, V/HR/V | 0.271 | 0.284 |
| Hydrogen rate, SCF/bbl | 6999 | 5019 |
| Results | | |
| 1000° F.$^+$ conversion, vol % | 58.3 | 59.1 |

TABLE II-continued

FEEDSTOCK PROPERTIES AND OPERATING CONDITIONS

| | | |
|---|---|---|
| Desulfurization, wt % | 73.7 | 74.0 |
| Denitrogenation, wt % | 42.9 | 45.0 |
| Vanadium removal, wt % | 83.4 | 87.0 |
| Nickel removal, wt % | 70.9 | 71.2 |
| CCR removal, wt % | 58.1 | 59.1 |
| 1000° F.$^+$ Product | | |
| Gravity, API | 4.6 | 5.0 |
| Sulfur, wt % | 2.9 | 2.8 |
| CCR, wt % | 25.4 | 25.4 |
| Toluene Ins, wt % | 0.17 | 0.08 |

Table III compares the properties of the instant catalyst with the catalysts used in related cases, U.S. Ser. Nos. 07/953,176; 07/870,970; and 08/077,807.

TABLE III

Properties Of The Catalyst Of This Invention
Catalyst E

| Pore Volume, cc/q (Micromerities Autopore Hg porosimeter) | U.S. Ser. No. 07/953,176 Catalyst D and G | Catalyst E | U.S. Ser. No. 07/953,176 Catalyst F and H | U.S. Ser. No. 07/870,970 Catalyst C |
|---|---|---|---|---|
| Total 4000 Å | 0.70–0.98 | 0.6–0.8 | 0.7–0.98 | 0.5–0.8 |
| ≧1000 Å | 0.10–0.22 | 0.05–0.14 | 0.15–0.32 | |
| ≧250 Å | 0.15–0.31 | 0.07–0.18 | 0.22–0.42 | (0.11–0.23) |
| ≧200 Å | 0.18–0.34 | 0.10–0.21 | 0.24–0.45 | |
| ≧100 Å | | | | |
| ≦100 Å | 0.15 MAX | 0.26 MAX | 0.20 MAX | |
| 100–200 Å | 0.40 MIN | 0.25 MIN | 0.33 MIN | |
| 100–250 Å | | | | |
| 200–1000 Å | | | | |
| 250–1000 Å | | | | |
| 1000–4000Å | | | | |

| Pore volume Distribution, of Total Pore Volume | | | | |
|---|---|---|---|---|
| Total ≧4000 Å | 100.0 | 100.0 | 100.0 | |
| ≧1000 Å | 14–22 | 9–17 | 22–33 | |
| ≧250 Å | 22–32 | 12–22 | 32–43 | 22–29 |
| ≧200 Å | 26–35 | 16–26 | 35–46 | |
| ≧100 Å | | | | |
| ≦100 Å | 15 MAX | 33 MAX | 20 MAX | |
| 100–200 Å | 50 MIN | 41 MIN | 34 MIN | |
| 100–250 Å | | | | |
| 200–1000 Å | | | | |
| 250–1000 Å | | | | |
| 1000–4000 Å | | | | |
| Pore Mode (dV/dD MAX from Hg) | 100–145 | 85–110 | 85–135 | 100–135 |
| Pore Volume, ± 20 A from dV/dD MAX, % PV < 200 A | 57 MIN | 37 MIN | 44 MIN | (EST 67 MIN, BASED ON 65 MIN < 250 A) |
| Surface Area, m²/g | 155–240 | 175–220 | 150–210 | 165–230 |
| Metals | | | | |
| NiO | 2.5–6.0 | 2.5–6.0 | 2.2–6.0 | 3.0–6.0 |
| MoO$_3$ | 13.0–24.0 | 13.0–24.0 | 7.0–24.0 | 14.5–24.0 |
| SiO$_2$ | <2.5 | <2 | <2 | — |
| P205 | <2 PREFER <0.2 | <2 PREFER <0.2 | <2 PREFER <0.2 | 0–6 PREFER <0.2 |

The alumina charge extrudates may be loaded with metals to yield a product catalyst containing a Group VIII non-noble oxide in amount of 2.5–6 wt %, preferably 2.5–3.5 wt %, say 2.9 wt % and a Group VIB metal oxide in amount of 13–24, preferably 13–16 wt %, say 15.4.

The Group VIII metal may be a non-noble metal such as iron, cobalt, or nickel. This metal may be loaded onto the alumina typically from a 10%–50%, say 30.0% aqueous solution of a water-soluble salt (e.g. a nitrate, acetate, oxalate etc.). The preferred metal may be nickel, employed as a 30 wt % aqueous solution of nickel nitrate.

The Group VIB metal is preferably chromium, molybdenum, or tungsten. This metal may be loaded onto the alumina typically from a 10%–25%, say 15% aqueous solution of a water-soluble salt such as ammonium molybdate.

It is a feature of the catalysts of the invention that they preferably contain not more than about 2 wt % of $P_2O_5$ and preferably less than about 0.2 wt %. (Phosphorus-containing components are not intentionally added during catalyst preparation). Presence of phosphorus undesirably contributes to sediment and toluene insolubles formation.

Silica ($SiO_2$) may be incorporated in small amounts typically up to about 2 wt %, although the benefits of the invention may be attained without addition of silica.

These catalyst metals may be loaded onto the alumina support by spraying the latter with a solution of the former. Although it is preferred to load the metals simultaneously, it is possible to load each separately. Small amounts of $H_2O_2$ may be added to stabilize the impregnating solution. It is preferred that solutions stabilized with $H_3PO_4$ not be used in order to avoid incorporating phosphorus into the catalyst. Loading of each metal may be effected by spraying the alumina support with the aqueous solution at 60° F.–100° F., say 80° F. followed by draining, drying at 220° F.–300° F., say 250° F. for 2–10 hours, say 4 hours, and calcining at 900° F.–1250° F., say 1000° F. for 0.5–5 hours, say 0.5 hour.

In practice of the process of this invention, the catalyst, preferably in the form of extruded cylinders of 0.038 inch diameter and 0.15 inch length may be placed within a reactor. The hydrocarbon charge is admitted to the lower portion of the bed in liquid phase at 650° F.–850° F., preferably 700° F.–825° F., say 780° F. and 1500–3500 psig, preferably 1800–2700 psia, say 2244 psia. Hydrogen gas is admitted with the hydrocarbon charge in amount of 2000–10,000 SCFB, preferably 3000–8000 SCFB, say 5019 SCFB. The hydrocarbon charge passes through the bed at a LHSV of 0.08–1.5, preferably 0.1–1, say 0.284. During operation, the bed expands to form an ebullated bed with a defined upper level. Operation is essentially isothermal with a typical maximum temperature difference between the inlet and the outlet of 0° F.–50° F., preferably 0° F.–30° F., say 15° F.

In a less preferred embodiment, the reaction may be carried out in one or more continuously stirred tank reactors (CSTR) which also provides essentially isothermal conditions.

During passage through the reactor, preferably containing an ebullated bed, the hydrocarbon feedstock may be converted to lower boiling products by the hydrotreating/hydrocracking reaction. In a typical embodiment, a charge containing 60–95 vol%, say 87.5 vol% boiling above 1000° F. and 5 vol %–40 vol%, say 12.5 vol% boiling in the 600° F.–1000° F. range may be converted to a hydrotreated product containing only 4 vol %–45 vol%, say 36 vol% boiling above 1000° F. The sulfur of the original charge is 3–7 wt %, typically 5 wt %; the sulfur content of the unconverted 1000° F.+ component in the product is 0.5–3.5 wt %, typically 2.8 wt %.

It is a particular feature of the catalysts of this invention that they permit operation to be carried out under conditions which yield a substantially low content of toluene insolubles in the product stream leaving hydrotreating. (Toluene insolubles sediment is measured using the IP-143 standard methods for analysis and testing of petroleum products). Toluene insolubles in the product are undesirable because they deposit on the inside of various pieces of equipment downstream of hydrotreating and interfere with proper functioning of e.g. pumps, heat exchangers, fractionating towers, etc.

Commonly toluene insolubles formed from hydrotreating the charge may be as high as 0.8 wt %, typically 0.15–0.5 wt %, say 0.17 wt %. It is a feature of the catalysts of this invention that they permit attainment of a 1000° F.$^+$ hydrotreated product with toluene insolubles content typically as low as 0.03–0.10 wt %, say 0.08 wt %.

It will be noted that catalysts of this invention, characterized by (i) 0.05–0.14 cc/g of pores in the $\geq$1000 Å range, (ii) 0.1–0.21 cc/g of pores in the $\geq$200 Å range, (iii) 0.26 cc/g maximum pores in the $\leq$100 Å range, and (iv) 0.25 cc/g minimum of pores in the 100 Å–200 Å range are particularly advantageous in that they permit attainment of product hydrocarbon streams containing the lowest content of toluene insolubles at highest conversion, while producing product characterized by low nitrogen, low sulfur, and low metals content.

ADVANTAGES OF THE INVENTION

It will be apparent to those skilled in the art that this invention is characterized by advantages including the following:

(i) it permits attainment of yield of hydrocarbon products boiling below 1000° F.;

(ii) it permits operation to yield a highly desulfurized hydrocarbon product;

(iii) it permits operation to yield a hydrocarbon product characterized by lower content of metals;

(iv) the 650° F.–1000° F. portion of the product is also characterized by a desirably lower content of nitrogen and sulfur;

(v) the 1000° F.+ component of the product is characterized by a significantly lower content of sulfur;

(vi) the 1000° F.$^+$ component of the product is characterized by a low content of toluene insolubles (0.03–0.10, say 0.08 wt %). Thus it would be expected to improve unit operability and to prevent unscheduled shutdowns caused by toluene insolubles deposition in the downstream fractionation equipment.

(vii) the liquid product is characterized by a significant reduction of asphaltenes and carbon residue.

Practice of the process of this invention will be apparent to those skilled in the art from the following wherein all parts are parts by weight unless otherwise stated. Control examples are designated by an asterisk.

DESCRIPTION OF SPECIFIC EMBODIMENTS

In the example, the following charge stock was employed:

TABLE IV

| Property | Charge Stocks |
|---|---|
| API Gravity | 4.8 |
| Sulfur | 5.0 |
| Nitrogen, wppm | 4480 |
| Vanadium, wppm | 134 |
| Nickel, wppm | 49 |
| CCR, wt % | 22.2 |

TABLE IV-continued

Charge Stocks

| Property | |
|---|---|
| 1000° F.+ | 87.5 |
| Sediment | NIL |
| Asphaltenes, wt % | 9.94 |
| Toluene Insolubles, wt % | 0.02 |

EXAMPLE I

In this example which represents the best mode presently known of carrying out the process of this invention, the charge hydrocarbon is a 4.8 API Arabian Medium/Heavy Vacuum Resid having the properties set forth in the table supra. It should be noted that this charge hydrocarbon is particularly characterized by the presence of 87.5 vol % of components having a boiling point above 1000° F., by a sulfur content of 5 wt %, by a vanadium content of 134 wppm, a nickel content of 49 wppm, and a nitrogen content of 4480 wppm.

The catalyst is prepared from a commercially available gamma alumina having the properties set forth in Table V which notes the Total Surface Area TSA in square meters per gram of alumina, Total Pore Volume TPV in cubic centimeters per gram, and the Pore Volume PV, as cubic centimeters per gram, arising from pores of noted diameter (A):

TABLE V

| Property | Finished Catalyst |
|---|---|
| TSA m²/g | 204 |
| TPV cc/g | 0.63 |
| PV ≥ 1000 Å, cc/g | 0.08 |
| PV ≥ 500 Å, cc/g | 0.09 |
| PV ≥ 300 Å, cc/g | 0.10 |
| PV ≥ 250 Å, cc/g | 0.10 |
| PV ≥ 200 Å, cc/g | 0.13 |
| PV ≥ 100 Å, cc/g | 0.44 |
| PV 100–200, cc/g | 0.31 |
| PV < 100 Å, cc/g | 0.19 |

It is to be particularly noted that the finished catalyst is characterized by a large volume (0.31 cc/g) in the 100–200 Å range, by a limited volume (0.19 cc/g) in the <100 Å range, by a Pore Mode (dV/dD MAX from Hg) of 90 Å, and by a Pore Volume ±20 Å from dV/dD MAX of about 37.7% of pores ≦200 Å.

This alumina in the form of extrudate of diameter of 0.035–0.041 inch is impregnated at 80° F. with an aqueous solution which contains nickel nitrate hexahydrate and ammonium molybdate and hydrogen peroxide. The catalyst is dried at 250° F. for 4 hours and calcined at 1000° F. for 30 minutes.

The product catalyst is characterized as follows:

TABLE VI

| Component | wt % |
|---|---|
| $MoO_3$ | 15.4 |
| NiO | 2.9 |
| $SiO_2$ | <0.5 |
| $SO_4$ | — |
| $Na_2O$ | — |
| $P_2O$ | <0.2 |

Charge hydrocarbon is admitted in liquid phase at 2244 psig to the ebullated bed reactor at an overall liquid space velocity LHSV of 0.284 and an overall average temperature of 780° F. Hydrogen is admitted in amount of 5019 SCFB.

Product is collected from the unit and analyzed to yield the following data:

TABLE VII

| Overall Performance | | |
|---|---|---|
| 1000° F.+ Conversion | vol % | 59.1 |
| Desulfurization | wt % | 74.0 |
| Denitrogenation | wt % | 45.0 |
| Ni removal | wt % | 71.2 |
| V removal | wt % | 87.0 |
| CCR Reduction | wt % | 59.1 |
| Asphaltenes Reduction | wt % | — |
| 1000° F+ Product | | |
| Asphaltenes | wt % | 11.8 |
| Gravity API | wt % | 5.0 |
| Total Nitrogen | wppm | 4411 |
| Sulfur | wt % | 2.8 |
| CCR | wt % | 25.4 |
| Toluene Insolubles | wt % | 0.08 |

From the above, it is apparent that it is possible to hydrotreat to attain 1000° F.+ Conversion (of e.g. 59.1%) with production of extremely low (0.08 wt % toluene insolubles). Operations on prior art catalysts are shown following.

EXAMPLE II

In Control Example II*, a typical prior art catalyst is employed having the following properties:

TABLE VII

| Property | ccg Example II* |
|---|---|
| TPV | 0.76 |
| >4000 Å | 0.06 |
| >1000 Å | 0.19 |
| >500 Å | 0.21 |
| >300 Å | 0.23 |
| >250 Å | 0.23 |
| >200 Å | 0.24 |
| >100 Å | 0.29 |
| <100 Å | 0.47 |
| <200 Å | 0.52 |
| 100–200 Å | 0.05 |
| 200–300 Å | 0.01 |
| 300–500 Å | 0.02 |
| 500–1000 Å | 0.02 |
| 1000–4000 Å | 0.13 |
| Metals wt % | |
| NiO | 3.1 |
| $MoO_3$ | 12.4 |
| $SiO_2$ | 0.02 |
| $P_2O_5$ | ≦0.2 |
| Surface Area m²/g | 315 |
| Pore Model (dv/dD Max from Hg) | 50 |
| Pore Volume, ± 20 Å from dV/dD Max, % PV < 200 Å | 74 |

EXAMPLE II*

The catalyst of Example II, is evaluated with the 4.8 API charge hydrocarbon set forth in Table IV. Conditions of operation include inlet hydrogen pressure of 2373 psia at 280° F. and overall LHSV of 0.27. Hydrogen is admitted in amount of 6999 SCFB to the one stage reactor.
The results as follows:

TABLE IX

| Property | | Value |
|---|---|---|
| 1000° F. Conversion | vol % | 58.3 |
| Overall Desulfurization | wt % | 73.7 |
| Overall Denitrogenation | wt % | 42.9 |
| Overall CCR Reduction | wt % | 58.1 |
| Overall Asphaltene Reduction | wt % | 54.4 |
| 1000° F.+ Toluene Insolubles | wt % | 0.17 |

It is seen that the catalyst of this invention, Example I provides similar desulfurization, denitrogenation, and CCR reduction to the prior art catalyst of Example II, while providing much lower toluene insolubles (0.08 wt % versus 0.17 wt %) at the 58–59 vol % 1000° F. conversion level.

Although this invention has been illustrated by reference to specific embodiments, it will be apparent to those skilled in the art that various charges and modifications may be made which clearly fall within the scope of the invention.

In Table X there is a comparison of the properties of different catalysts used in the art.

TABLE X

CATALYST PROPERTIES

| Catalyst | A | | | | |
|---|---|---|---|---|---|
| Catalyst | 1 | 2 | E | F | B |
| PORE, DIA, Å | PORE VOLUME, CC/GM | | | | |
| Total | 0.76 | 0.74 | 0.63 | 0.87 | 0.65 |
| >4000 | 0.06 | 0.08 | 0.00 | 0.14 | 0.00 |
| >1000 | 0.19 | 0.18 | 0.08 | 0.23 | 0.01 |
| >500 | 0.21 | 0.21 | 0.09 | 0.26 | 0.02 |
| >300 | 0.23 | 0.23 | 0.10 | 0.30 | 0.04 |
| >250 | 0.23 | 0.24 | 0.10 | 0.32 | 0.05 |
| >200 | 0.24* | 0.26* | 0.13* | 0.37* | 0.07** |
| >100 | 0.29 | 0.32 | 0.44 | 0.71 | 0.59 |
| <100 | 0.47*** | 0.42*** | 0.19***** | 0.16***** | 0.06***** |
| 100–200 | 0.05 | 0.06 | 0.31**** | 0.34**** | 0.52**** |
| 200–300 | 0.01 | 0.03 | 0.03 | 0.07 | 0.03 |
| 300–500 | 0.02 | 0.02 | 0.01 | 0.04 | 0.02 |
| 500–1000 | 0.02 | 0.03 | 0.01 | 0.03 | 0.01 |
| 1000–4000 | 0.13 | 0.10 | 0.08 | 0.08 | 0.01 |
| METALS, WT % | | | | | |
| NiO | | 3.1 | 2.9 | 2.6 | 3.0 |
| MoO$_3$ | | 12.4 | 15.4 | 9.8 | 15.0 |
| SiO$_2$ | | 0.02 | <0.5 | 0.02 | 2.5 |
| P$_2$O$_5$ | | ≦0.2 | ≦0.2 | ≦0.2 | ≦0.2 |
| MICROPORE MODE, (dV/dD MAX), Å | | 50 | 90 | 95 | 116 |
| Surface Area, m²/g | | 315 | 204 | 172 | 194 |
| DIA Å | PERCENT OF TOTAL PORE VOLUME | | | | |
| TOTAL | 100 | 100 | 100 | 100 | 100 |
| >4000 | 7.9 | 10.8 | 0.0 | 16.1 | 0.0 |
| >1000 | 25.0 | 24.3 | 12.7 | 26.4 | 1.5 |
| >500 | 27.6 | 28.4 | 14.3 | 29.9 | 3.1 |
| >300 | 30.3 | 31.1 | 15.9 | 34.5 | 6.2 |
| >250 | 30.3 | 32.4 | 15.9 | 36.8 | 7.7 |
| >200 | 31.6* | 35.1* | 20.6* | 42.5* | 10.8** |
| >100 | 38.2 | 43.2 | 69.8 | 81.6 | 90.8 |
| <100 | 61.8*** | 56.8*** | 30.2***** | 18.4***** | 9.2****** |
| 100–200 | 6.6 | 8.1 | 49.2**** | 39.1**** | 80.1**** |
| 100–1000 | 6.6 | 10.8 | 7.9 | 16.1 | 9.2 |
| 1000–4000 | 17.1 | 13.5 | 12.7 | 10.3 | 1.5 |

| Catalyst | C | D | G | H |
|---|---|---|---|---|
| PORE, DIA, Å | PORE VOLUME, CC/GM | | | |
| Total | 0.77 | 0.27 | 0.81 | 0.77 |
| >4000 | 0.07 | 0.03 | 0.09 | 0.07 |
| >1000 | 0.14 | 0.16 | 0.13 | 0.23 |
| >500 | 0.17 | 0.20 | 0.15 | 0.27 |
| >300 | 0.20 | 0.24 | 0.17 | 0.28 |
| >250 | 0.21 | 0.26 | 0.18 | 0.29 |
| >200 | 0.23* | 0.29* | 0.22* | 0.31* |
| >100 | 0.66 | 0.78 | 0.77 | 0.68 |
| <100 | 0.11***** | 0.09***** | 0.04***** | 0.09***** |

TABLE X-continued

| | CATALYST PROPERTIES | | | |
|---|---|---|---|---|
| 100–200 | 0.43**** | 0.49**** | 0.55**** | 0.37**** |
| 200–300 | 0.03 | 0.05 | 0.05 | 0.03 |
| 300–500 | 0.03 | 0.04 | 0.02 | 0.01 |
| 500–1000 | 0.03 | 0.04 | 0.02 | 0.04 |
| 1000–4000 | 0.07 | 0.13 | 0.04 | 0.16 |
| METALS, WT % | | | | |
| NiO | 3.3 | 3.1 | 3.3 | 3.5 |
| $MoO_3$ | 15.2 | 14.0 | 15.1 | 14.0 |
| $SiO_2$ | ≦2.5 | 2.0 | 1.9 | — |
| $P_2O_5$ | ≦0.2 | ≦0.2 | ≦0.2 | ≦0.2 |
| MICROPORE MODE, (dV/dD MAX), Å | 105 | 116 | 125 | 125 |
| Surface Area, $m^2/g$ | 209 | 199 | 210 | 165 |
| DIA Å | PERCENT OF TOTAL PORE VOLUME | | | |
| TOTAL | 100 | 100 | 100 | 100 |
| >4000 | 9.1 | 3.4 | 11.1 | 9.1 |
| >1000 | 18.2 | 18.4 | 16.0 | 29.2 |
| >500 | 22.1 | 23.0 | 18.5 | 35.1 |
| >300 | 26.0 | 27.6 | 21.0 | 36.4 |
| >250 | 27.3 | 29.9 | 22.2 | 37.7 |
| >200 | 29.9* | 33.3 | 27.2* | 40.2* |
| >100 | 85.7 | 89.7 | 95.1 | 88.3 |
| <100 | 14.3***** | 10.3***** | 4.9***** | 11.7***** |
| 100–200 | 55.8**** | 56.3**** | 68.0**** | 48.0**** |
| 100–1000 | 11.7 | 15.0 | 11.1 | 10.4 |
| 1000–4000 | 9.1 | 15.0 | 4.9 | 20.8 |

*Desirable feature: Large volume macropores
**Undesirable feature: Limited volume of macropores (up to 0.11 cc/gm)
***Undesirable feature: Large volume micropores
****Desirable feature: Large volume 100–200 Å
***** Desirable feature: Limited volume <100 Å

What is claimed:

1. A process for hydrotreating a charge hydrocarbon feed containing components boiling above 1000° F., toluene insolubles formers, sulfur, metals, asphaltenes, carbon residue, and nitrogen which comprises contacting said charge hydrocarbon feed with hydrogen at isothermal hydrotreating conditions in the presence of, as catalyst, a porous alumina support bearing 2.5–6 wt % of a non-noble Group VIII metal oxide, 13–24 wt % of a Group VIB metal oxide, 0–2 wt % of silica, and 0–2 wt % of a phosphorus oxide, said catalyst having a Total Surface Area of 175–220 $m^2/g$, a Total Pore Volume of 0.6–0.8 cc/g, and a Pore Diameter Distribution wherein less than about 33% of the Total Pore Volume is present as primary micropores of diameter less than about 100 Å, at least about 41% of the Total Pore Volume is present as secondary micropores of diameter of about 100Å–200 Å and about 16–26% of the Total Pore Volume is present as mesopores of diameter ≧200 Å, thereby forming hydrotreated product containing decreased contents of components boiling above 1000° F., toluene insolubles, sulfur, metals, carbon residue, asphaltenes and nitrogen; and recovering said hydrotreated product containing decreased content of components boiling above 1000° F., toluene insolubles, sulfur, metals, carbon residue, asphaltenes and nitrogen.

2. A process for hydrotreating a charge hydrocarbon feed as claimed in claim 1 wherein said catalyst the content of Group VIB metal oxide is 13–16 wt %.

3. A process for hydrotreating a charge hydrocarbon feed as claimed in claim 1 wherein said catalyst the content of $SiO_2$ is less than about 0.5 wt %.

4. A process for hydrotreating a charge hydrocarbon feed as claimed in claim 1 wherein said catalyst the content of $P_2O_5$ is less than about 0.2 wt %.

5. A process for hydrotreating a charge hydrocarbon feed as claimed in claim 1 wherein said catalyst the Total Surface Area is about 185–210 $m^2/g$.

6. A process for hydrotreating a charge hydrocarbon feed as claimed in claim 1 wherein said catalyst the Total Pore Volume is about 0.6–0.7 cc/g.

7. A process for hydrotreating a charge hydrocarbon feed as claimed in claim 1 wherein said catalyst the Pore Volume of pores of diameter less than about 100 Å is less than about 0.26 cc/g.

8. A process for hydrotreating a charge hydrocarbon feed as claimed in claim 1 wherein said catalyst the Pore Mode dV/dD MAX from Hg is 85–110 Å.

9. A process for hydrotreating a charge hydrocarbon feed as claimed in claim 1 wherein said catalyst the pore volume ±20 Å from dV/dD MAX is at least 37%, as a percent of pores <200 Å.

10. A process for hydrotreating a charge hydrocarbon feed as claimed in claim 1 wherein said catalyst the secondary micropores of diameter of about 100–200 Å are present in an amount of at least about 48% of Total Pore Volume.

11. A process for hydrotreating a charge hydrocarbon feed as claimed in claim 1 wherein said catalyst the secondary micropores of a diameter of about 100–200 Å are present in an amount of at least about 0.3 cc/g.

12. A process for hydrotreating a charge hydrocarbon feed as claimed in claim 1 wherein said cataylst the mesopores of diameter ≧200 Å are present in an amount of 0.1–0.15 cc/g.

13. A process for hydrotreating a charge hydrocarbon feed as claimed in claim 1 wherein said catalyst the macropores of diameter ≧1000 Å are present in an amount of about 9%–17% of Total Pore Volume.

14. A process for hydrotreating a charge hydrocarbon feed as claimed in claim 1 wherein said catalyst the macropores of diameter ≧1000 Å are present in an amount of about 0.05–0.14 cc/g.

* * * * *